United States Patent [19]
Brown et al.

[11] Patent Number: 4,569,822
[45] Date of Patent: Feb. 11, 1986

[54] POWDER METAL PROCESS FOR PREPARING COMPUTER DISK SUBSTRATES

[76] Inventors: Sanford W. Brown, 923 E. Broadway St., Glendale, Calif. 91205; Robert W. Hill, 1567 Covington Ave., Westlake Village, Calif. 91361

[21] Appl. No.: 609,455

[22] Filed: May 11, 1984

[51] Int. Cl.$^4$ ............................................. B22F 3/16
[52] U.S. Cl. ..................................... 419/23; 419/36; 419/42; 419/43; 419/46; 419/32; 360/135
[58] Field of Search ....................... 419/10, 32, 36, 47, 419/42, 28, 46, 23, 43; 360/135

[56] References Cited

U.S. PATENT DOCUMENTS 4,430,387 2/1984 Nakagawa et al. ................. 360/135

Primary Examiner—Allan M. Lieberman
Attorney, Agent, or Firm—Donald Diamond

[57] ABSTRACT

A method is provided for preparing computer disk substrates having low surface amplitude which comprises: (a) forming a liquid suspension containing aluminum powder, an aluminum alloying element and a borate composition by initially admixing the borate composition with a volatile liquid medium to obtain a borate solution and thereafter admixing the aluminum powder and aluminum alloying element with the borate solution to produce the liquid suspension; (b) heating the liquid suspension to remove the liquid medium and to obtain a dry aluminum powder composition; (c) isostatically pressurizing the dry aluminum powder composition and roller compacting the same into sheet form; (d) heating and sintering the sheet form in a non-oxidizing atmosphere; and (e) cutting and compressing the sintered sheet into computer disk substrate configuration.

14 Claims, No Drawings

POWDER METAL PROCESS FOR PREPARING COMPUTER DISK SUBSTRATES

BACKGROUND OF THE INVENTION

This invention relates to computer disk substrates and, more particularly, to aluminum disk substrates prepared from aluminum powder compositions.

The term "powder metallurgy" generally characterizes a process for making a wide range of components and shapes from a variety of metals and alloys in powder form. The process is automated and uses pressure and heat to convert the powder into metal parts of net or near-net shapes, which require a minimum amount of secondary finishing.

The most common metals available in powder form are iron, tin, nickel, copper, aluminum and titanium, and refractory metals such as tungsten, molybdenum, tantalum and niobium. Prealloyed powders such as low-alloy steels, bronze, brass and stainless steel are produced in which each particle is an alloy. Nickel-cobalt-base superalloys and tooled steels are also available in powder form. Metal powders are highly engineered materials that range in size from 0.1 to 1,000 micromicrons with shapes that are spherical, acicular, irregular, dendritic, straight, angular or fragmented. Particle shape has a direct influence on the density, surface area, permeability and flow characteristics of a powder. Porosity of the powder particle varies with the method of production and influences the density of the particle and the final product.

Metal powders are produced by three major methods which can be classified as physical, chemical and mechanical. The most important physical method of metal powder production is atomization, wherein a stream of molten metal is broken up into droplets that freeze into powder particles. In most atomizing processes, a gas or a stream of liquid such as water impinges upon the liquid metal stream to break it into droplets. Iron, steel, aluminum, copper, stainless steel, brass, tin, bronze, zinc, and high-alloy powders are made in this manner. In the chemical method of powder production, a metal powder is produced by chemical decomposition of a compound of the metal as illustrated by the reduction of copper oxide to copper powder with hydrogen and by the electrodeposition of copper powder from an aqueous copper sulfate solution. In the mechanical method, certain materials such as iron, iron-aluminum alloys, ferrosilicon and ferrophosphorous can be converted into powder form by mechanical comminution.

In the basic powder metalurgy process, intense pressure ranging from about 10 tons per square inch to in excess of 60 tons per square inch are applied to the powder at ambient temperatures to obtain a green compact which is heated and sintered in a suitable furnace to bond the particles into a strong configuration which is observed as an increase in mechanical and physical properties.

Although most powder metallurgy parts and products are pressed in mechanical or hydraulic compacting presses, other techniques such as cold and hot isostatic pressing, powder metallurqy forging, and direct powder rolling are used to make a variety of end products. In isostatic compacting, gas or fluid pressure is applied uniformly to a flexible mold or container holding the metal powder to be compacted and since pressure from all directions is applied to the powder mass, it is possible to obtain a very uniform unsintered density and high uniformity of properties. In hot isostatic pressing, metal powder is placed in a sealed mold and then subjected to isostatic pressure at elevated temperatures. Powder metallurgy forging provides parts which are stronger than conventional powder metallurgy parts and provides tolerances and finishes that, in most cases, require little or no subsequent machining. In the forging process, preforms are compacted in a conventional compacting press, sintered, fed through a heating unit at a selected temperature, and transferred into the die area and formed in a closed die to its final shape with one cycle of the press; the formed part is then subjected to final heat treatment and machining, if required. In powder rolling, sometimes called roll compacting, metal powder is fed from a hopper into the gap of a rolling mill and emerges as a continuous compacted strip or sheet. Coinage strip is made by powder rolling.

Various additives and processing techniques have been disclosed in the patent literature for use in converting metal powder compositions to solidified finished forms by powder metallurgy.

U.S. Pat. No. 2,744,011 (Samuel et al., 1956) discloses a powder metallurgy process which comprises admixing a sinterable metal powder such as iron powder with a volatile liquid carrier, 4 such as methanol, containing a flux, such as ethyl silicate, to obtain a paste, forming the paste into an article, drying the article and subjecting the article to sintering treatment at, for example, 1380° C. for 2 hours. It is pointed out that the flux acts as a bonding agent for the particles of the powder in the cold and, during sintering, as a solvent for films of oxide and other compounds on the surface of the particles, as well as a protective agent against further oxidation, with the absence of flux preventing contact of free particles and satisfactory interpenetration. It is further noted that boric acid and borates are substances whose action is primarily one of fluxing during sintering but these substances, in contrast to silicates and silicones, do not set hard from the liquid state and cannot, therefore, be used alone for compacting and agglomerating the powder.

U.S. Pat. No. 3,166,833 (Globus, 1965) discloses a powder metallurgy process which comprises admixing and milling a metal powder, such as titanium powder, with an alkali metal borohydride, such as sodium borohydride, compacting the admixture at a pressure between 10 and 50 tons per square inch to produce green briquettes having a density of about 60 to 80% of the theoretical density, and sintering in a high vacuum furnace for about 4 hours or more at a temperature between 2,000° and 2,500° F. and a vacuum of 1 to 2 microns of mercury. It is suggested that the alkali metal borohydride decomposes and reacts during the sintering, liberating the alkali metal, which combines with and removes the oxygen and thus acts as a deoxidizing agent while the boron combines with the metal to form a stable boride.

U.S. Pat. No. 3,232,753 (St. Pierre, 1966) discloses a powder metallurgy process which comprises milling aluminum powder in an aqueous solution of copper sulfate to remove the oxide coating from the aluminum powder and coat the aluminum powder with copper, separating the copper coated aluminum powder from the solution, compacting the coated aluminum powder and sintering the compact in a non-oxidizing atmosphere.

U.S. Pat. No. 3,250,838 (Bartoszak, 1966) discloses a powder metallurgy process which comprises blending aluminum powder, copper flake, copper powder and a stearate lubricant, compacting the resulting mixture to obtain green compacts, and subjecting the compacts to sintering.

U.S. Pat. No. 3,687,657 (Storchheim, 1972) discloses a powder metallurgy process which comprises mechanically mixing aluminum powder, copper powder and magnesium or zinc powder, compacting the resulting mixture in a die coated with a lubricant to a density between 92 and 97% of theoretical density, and selectively heating-up the resulting compact to sintering temperature in ambient atmospheric air.

SUMMARY OF THE INVENTION

In accordance with this invention, there is provided a method for preparing computer disk substrates from aluminum powder compositions which comprises:

forming a liquid suspension of an aluminum powder composition containing, per 100 parts by weight of aluminum powder, from about 0.1 to about 5.0 parts by weight of an aluminum alloying element, and from about 0.75 to about 5.0 parts by weight of a borate composition selected from the group consisting of (a) disodium octaborate tetrahydrate, (b) a borate blend comprising from about 20 to about 40 wt. % of boric acid and from about 60 to about 80 wt. % of sodium tetraborate, and (c) mixtures thereof by initially admixing said borate composition with a volatile liquid medium to obtain a borate solution and thereafter admixing the aluminum powder and the aluminum alloying element with the borate solution to produce the liquid suspension;

treating the liquid suspension to remove the liquid medium and to obtain a dry aluminum powder composition;

compacting the dry aluminum powder composition into sheet form;

heating and sintering said sheet form in a non-oxiding atmosphere; and cutting and compressing the sintered sheet into disk substrate configuration.

DETAILED DESCRIPTION

The aluminum powder compositions which can be used in the powder metallurgy process of this invention to prepare computer disk substrates comprise aluminum powder, a borate composition and optionally, but advantageously, an aluminum alloying element.

It is desirable but not essential that the aluminum powder be relatively pure metal such as, for example, helium atomized aluminum. In such metal, the oxide coating surrounding the aluminum particles is minimized. However, aluminum atomized with other impinging agents can also be employed in the practice of the invention without deleterious results. Impurities contained in the aluminum should be minimized. Preferably, the aluminum oxide content of the aluminum powder should not exceed about 0.01% and the purity of the aluminum should be at least about 99.9%. The aluminum powder used herein advantageously has a particle size from about 14 to 22 microns (from about +100 to about −325 mesh).

Where a pure aluminum product is desired, no additional metal need be employed. However, the strength properties as well as other attributes of aluminum can be enhanced by the use of other alloying elements. Thus, for example, a stronger product can be obtained in the case of an aluminum-copper alloy containing 4% copper than can be obtained with pure aluminum. Accordingly, it is often highly advantageous for the development of a strong final product to include a small quantity of particulate copper in the powder mix. The particulate copper that can be used herein advantageously has a purity of at least about 99.9%, a particle size from about 14 to about 20 microns (from about +200 to about −325 mesh) and is generally present in an amount from about 0.1 to about 5.0 parts by weight per 100 parts by weight of aluminum powder. Other alloying elements which can be used include zinc, silicon, manganese, chromium, nickel, brass, lithium, boron and bismuth.

The borate composition which can be used to facilitate processing of the aluminum powder mix and to improve the properties of the finished product include (a) disodium octaborate tetrahydrate, (b) a borate blend comprising about 20 to 40 wt. % of boric acid and about 60 to about 80 wt. % of sodium tetraborate, and (c) mixtures thereof. The borate composition is generally present in the aluminum powder mix in an amount from about 0.75 to about 5.0 parts by weight per 100 parts by weight of aluminum powder and, preferably, in an amount from about 1.0 to about 2.0 parts by weight per 100 parts by weight of aluminum powder. A suitable borate composition has a particle size of about 200 mesh and purity of about 99.9%.

The volatile liquid medium to which the powders are added should preferably have a high wetting power and liquids such as water or ethyl alchohol or other suitable solvents can be used for this purpose. The liquid medium is generally used in an amount from about 10 to about 30 parts by weight per 100 parts by weight of the total powder composition, with the concentration of the liquid medium being inversely proportional to the particle size of the aluminum powder.

The liquid suspension of the aluminum powder composition is was formed by initially admixing the borate composition with the volatile liquid medium to obtain a borate solution and then admixing the aluminum powder and any aluminum alloying element with the borate solution to produce the liquid suspension. Upon completion of the admixing step, the liquid suspension is heated, preferably, under vacuum conditions to remove the volatile liquid medium and to obtain a dry aluminum powder composition.

The dry aluminum powder composition is transferred to a pressure responsive, flexible container disposed within a suitable pressurizing bin, with the outlet end of the container being in association with a conduit that has its discharge end at the feed gap of a two-high rolling mill. Isostatic pressure from about 5 to about 10 pounds per square inch is advantageously applied to the flexible container for pressurizing the powder and the isostatically pressurized powder is beneficially heated to a moderately elevated temperature prior to passage through the rolling mill.

The rolling mill applies a pressure of about 50 tons per square inch to the powder to compact and compress the same into sheet form having a density of about 99% of theoretical density.

The sheet form is heated and sintered while being conveyed through a substantially enclosed sintering furnace that is (a) equipped with an electrical heating unit for maintaining the furnace at a temperature of about 1,100° F. and (b) provided with a non-oxidizing atmosphere in the form of a nitrogen blanket at a pressure of about 5 to about 8 pounds per square inch.

Following the sintering step, the sintered sheet while still at an elevated temperature as, for example, 700° F. is conveyed to an appropriate press equipped with a suitably designed punch and die where the sheet is cut and compressed into a computer disk substrate configuration at a pressure from about 40 to about 60 tons per square inch.

In view of the foregoing description, it will become apparent to those of ordinary skill in the arts that equivalent modifications thereof may be made without departing from the spirit and scope of this invention.

That which is claimed is:

1. A method for preparing computer disk substrates from aluminum powder compositions which comprises:
    forming a liquid suspension of an aluminum powder composition containing, per 100 parts by weight of atomized aluminum powder, from about 0.1 to about 5.0 parts by weight of an aluminum alloying element, and from about 0.75 to about 5.0 parts by weight of a borate composition selected from the group consisting of (a) disodium octaborate tetrahydrate, (b) a borate blend comprising from about 20 to about 40 wt. % of boric acid and from about 60 to 80 wt. % of sodium tetraborate, and (c) mixtures thereof by initially admixing said borate composition with a volatile liquid medium to obtain a borate solution and thereafter admixing said atomized aluminum powder and said aluminum alloying element with said borate solution to produce said liquid suspension, wherein the amount of liquid medium is from about 10 to about 30 parts by weight, per 100 parts by weight of aluminum powder composition, with the concentration of the liquid medium being inversely proportional to the particle size of the aluminum powder;
    treating the liquid suspension to remove the liquid medium and to obtain a dry aluminum powder composition;
    isostatically pressurizing the dry aluminum powder composition and roller compacting the same into sheet form;
    heating and sintering said sheet form in a non-oxidizing atmosphere; and
    cutting and compressing the sintered sheet into a disk substrate configuration.

2. The method of claim 1 wherein the aluminum powder has a particle size from about 14 to about 22 microns.

3. The method of claim 1 wherein the concentration of the borate composition is from about 1.0 to about 2.0 parts by weight per 100 parts by weight of aluminum powder.

4. The method of claim 3 wherein the borate composition is disodium octaborate tetrahydrate.

5. The method of claim 3 wherein the borate composition is a mixture of boric acid and sodium tetraborate.

6. The method of claim 1 wherein the aluminum alloying element is copper powder having a particle size from about 14 to about 20 microns.

7. The method of claim 1 wherein the liquid suspension is heated to evaporate the liquid medium therefrom and to obtain a dry aluminum powder composition.

8. The method of claim 1 wherein the liquid medium is ethyl alcohol.

9. The method of claim 1 wherein the dry aluminum powder composition is converted into sheet form by passing the powder between the rollers of a rolling mill.

10. The method of claim 9 wherein the powder composition is fed to the rolling mill from a flexible container maintained at an isostatic pressure from about 5 to about 10 pounds per square inch.

11. The method of claim 10 wherein the isostatically pressurized powdered composition is heated to an elevated temperature prior to passage through the rolling mill.

12. The method of claim 1 wherein the heating and sintering step is carried out in a nitrogen atmosphere.

13. The method of claim 1 wherein the cutting and compressing of the sintered sheet into a disk substrate configuration is effected by employing a punch pressure on the sheet from about 40 to about 60 tons per square inch.

14. The method of claim 13 wherein the cutting and compressing of the heated and sintered sheets is undertaken before said sheet has cooled to ambient temperature.

* * * * *